US006800964B2

(12) United States Patent
Beck

(10) Patent No.: US 6,800,964 B2
(45) Date of Patent: Oct. 5, 2004

(54) PLURAL CONFIGURABLE DC SOURCES TO PROVIDE OPTIMAL POWER TO PLURAL CONFIGURABLE INVERTERS

(76) Inventor: Bernhard Beck, Marienstrasse 13, 97332 Volkach (DE)

( * ) Notice: Subject to any disclaimer, the term of this patent is extended or adjusted under 35 U.S.C. 154(b) by 214 days.

(21) Appl. No.: 10/166,021

(22) Filed: Jun. 10, 2002

(65) Prior Publication Data

US 2003/0227219 A1 Dec. 11, 2003

(51) Int. Cl.⁷ .................................................. H02H 3/02
(52) U.S. Cl. ........................................ 307/126; 307/80
(58) Field of Search ........................ 307/126, 80, 130, 307/131, 117, 44, 45; 323/906; 136/244, 252

(56) References Cited

U.S. PATENT DOCUMENTS 4,175,249 A * 11/1979 Gruber ........................ 323/271
4,742,243 A * 5/1988 Zabar et al. .................. 307/81

* cited by examiner

*Primary Examiner*—Shawn Riley
(74) *Attorney, Agent, or Firm*—Edwin D. Schindler

(57) ABSTRACT

A system for feeding direct current into an alternating current network includes a plurality of active inverters with each of the active inverters having an optimum input power and being connected at a respective input side to at least one direct current generator of fluctuating output power. A switching device is included for the one or more direct current generators from a first active inverter to a second active inverter, or vice-versa, for effecting a switchover operation, with a control device initiating the switchover operation upon fulfillment of a condition; the control device including a device for determining when the condictionis fulfilled.

8 Claims, 1 Drawing Sheet

Figure 1:
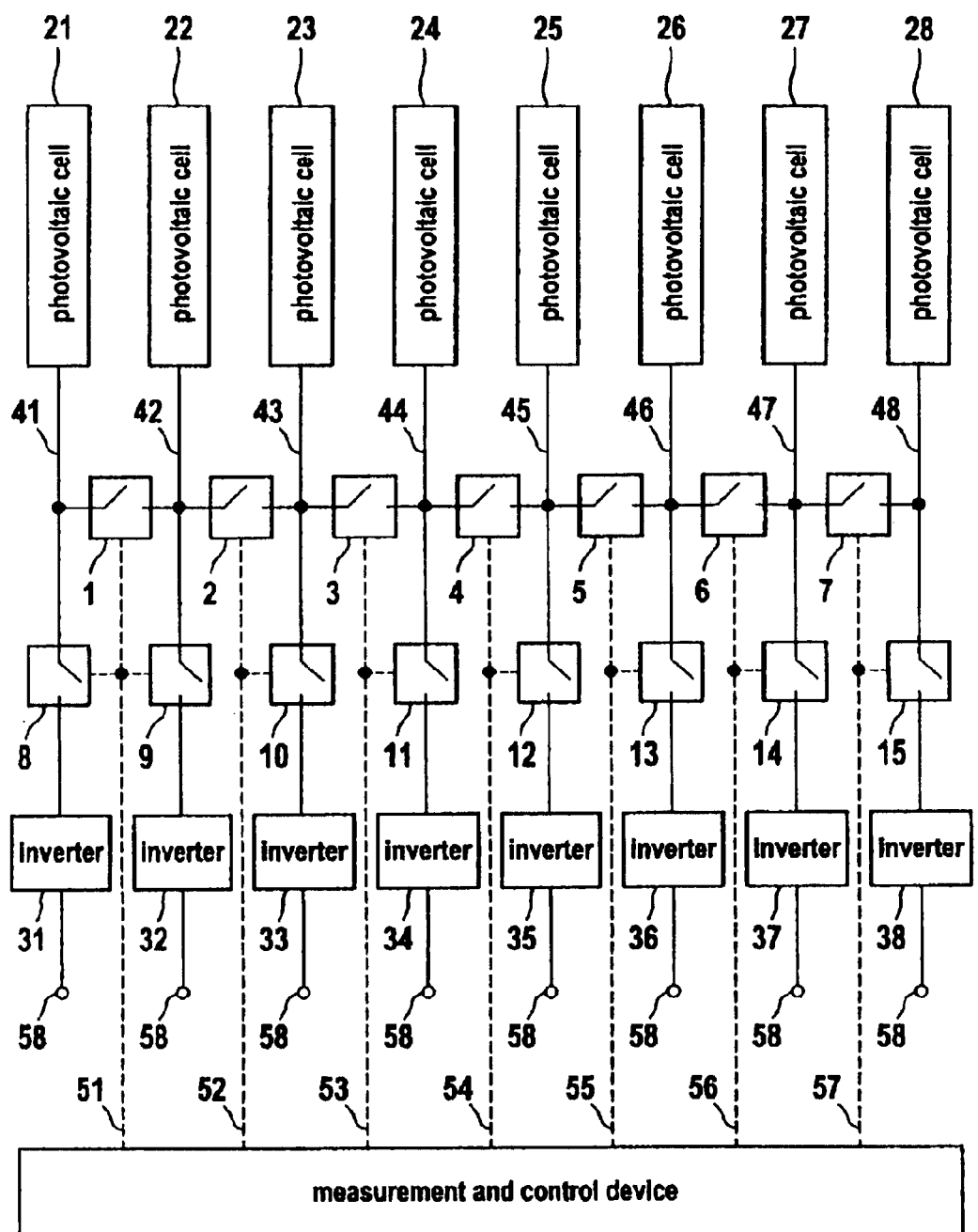

PLURAL CONFIGURABLE DC SOURCES TO PROVIDE OPTIMAL POWER TO PLURAL CONFIGURABLE INVERTERS

BACKGROUND OF THE INVENTION

1. Technical Field of the Invention

The invention relates to a system for feeding direct current into the alternating current network. It serves for optimising the energy input and is preferably used for converting direct current from photovoltaic systems having a plurality of rows of series-connected photovoltaic elements. The proposed system can, in particular, be advantageously operated in the case of relatively large network feeding systems.

2. Description of the Prior Art

Known photovoltaic systems usually consist of a plurality of inverters, which are connected at their input side in each case to one or more rows of series-connected photovoltaic elements. The inverters and photovoltaic elements are hard wired, so that no connection variants during operation are possible.

In arrangements of this kind, it is disadvantageous that operation of the system with optimum input power is only possible temporarily. This condition occurs more or less randomly when the current generators connected to an inverter just happen, by virtue of the prevailing insolation, to supply the output powers that are necessary for optimum operation of the inverters.

Since, in our latitudes, insolation is subject to severe fluctuations, both within the course of a day and dependent on weather and season, insolation with the intensity suitable for optimum operation is relatively rarely available. At other times, the inverters operate in partial load. In the course of a year, these times add up to by far the greater portion of time.

In partial load mode, the efficiencies of the inverters decrease significantly and, in particular in the lower partial load mode, only poor efficiencies are present. Photovoltaic systems according to the prior art therefore operate with unsatisfactory efficiency for by far the greatest portion of a year. The poor efficiency leads to losses in the feeding of the generated energy into the alternating current network, which reduce the profitability of the system.

SUMMARY OF THE INVENTION

Against this background, the object of the invention is to provide a system that feeds current for alternating current generators into the alternating current network, and whose efficiency is significantly higher than that of known systems.

Starting from a system with at least two active inverters, which are in each case characterised by optimum input performance and in each case are connected at their input side to at least one direct current generator of fluctuating output power and a measurement device, this object is solved in that switching elements for carrying out a switchover operation are provided, and the switchover operation effects a separation of at least one current generator from a first inverter and a connection of this/these current generator(s) to a second inverter, a control device for initiating the switchover operation is provided, and the initiation of the switchover operation is dependent on the fulfilling of a condition, which can be stored in the control device.

The proposed arrangement generally has a plurality of inverters, which are connected at the input side in each case to one or more direct current generators of fluctuating output power. If the fluctuation of the output power is manifested in a decrease of the output power, there is inevitably a fall in the input power of the inverters corresponding thereto and thereby in their efficiency. To counteract this effect, according to the gist of the invention, the number of current generators connected to an active inverter is kept variable. In practice, this object is achieved by means of corresponding switching elements. These elements permit one or more of the current generators assigned to an inverter to be separated from the latter and connected to a different inverter.

Here, the initiation of the switchover process is dependent on the satisfaction of a condition, which is specifiable by the control device. An essential assertion of the condition—which will be discussed in greater detail below—is that a connection of current generators occurs whenever the input power to the inverter under consideration has fallen off to the extent that it can no longer operate in the optimum efficiency range. In the case of inverters without connected current generators, the control device usually carries out deactivation.

According to a feature of the invention, the switchover operation is carried out for all inverters and current generators whose input and output powers satisfy the condition. This procedure leads to the situation that the number of active inverters within the system is reduced; the number of the current generators connected to the active inverters within the system is increased. For the respective active inverters, this means that in each case they can operate at or close to the optimum operating point. The result of this, for the entire system for feeding electrical energy from direct current generators into the alternating current network, is operation in the optimum efficiency range. Losses in feeding are avoided in the case of systems according to the present invention; the profitably of the system is increased compared with systems according to the prior art. With the embodiment of photovoltaic systems according to the present invention, they can be operated with optimum efficiency throughout the entire year.

In a further development of the invention, preferred conditions are disclosed, on the meeting of which the initiation of the switchover operation is dependent, and which can be stored in the control device.

According to the present invention, a possible condition is satisfied when the measurement device ascertains that the actual input power applied to a second inverter has fallen to a value which is below the optimum input power by an amount which corresponds to the total of the output powers of n current generators connected to a first inverter, n being a natural number whose smallest value is equal to 1 and whose maximum value is equal to the number of all the current generators connected to the first inverter, and n being specifiable by the control device.

From this further development, two variants are of particular interest, which, according to a feature of the invention, are provided where n is equal to 1 or n is equal to the number of all current generators connected to the first inverter. Both variants are described in greater detail below. Variant one comprises the further development in which n is equal to the number of all current generators connected to a first inverter. Variant two is the further development where n is equal to 1. As regards the content, these conditions mean that in variant one all current generators connected to an inverter are connected to another inverter, in variant two, by contrast, to only one of the current generators.

The content formulated in the two variant can be illustrated most simply by starting from an embodiment of a system in which, according to another feature of the invention, each inverter is connected at its input side to a current generator and the inverters and the current generators are in each case identical to one another.

For the starting state of this system, it is assumed that all current generators have an output power which corresponds to the optimum input power of the inverters. With falling output power, the output powers to all current generators are reduced and the corresponding input powers to the inverters are constant. When the input power to all inverters has fallen to 50% of the optimum input power, the aforementioned condition for switchover is satisfied.

The conditions defined by variant one and variant two are identical in the present case, since the number n of current generators connected to an inverter is equal to 1 and 1 also corresponds to the maximum number of connected current generators. The condition formulated in variant one (or two) is then satisfied as follows:

The actual input power at a second inverter has fallen to 50% of the optimum input power The output power at a level of 50% of the current generator connected to a first inverter corresponds to the power drop at the second inverter After the satisfaction of this condition, according to the invention a separation of n (=1) current generators from a first inverter and a connection of these n (=1) current generators to a second inverter take place. According to a further feature of the invention, this switchover operation is carried out for all inverters and current generators whose input and output powers satisfy the condition. For the example under consideration, this means in the end result that the current generators are disconnected from a half of the inverters and are connected to the remaining inverters in each case. The inverters without current generators are subsequently deactivated. The number of active inverters is thereby reduced to a half, while the number of current generators connected to each active inverter is doubled. By this means, in the case of the active inverters, the input power is raised to the optimum input power again. The operation of the inverters is therefore carried out in the optimum efficiency range. Correspondingly, the overall efficiency of the system again reaches its maximum.

The process is repeated in a similar manner between the active inverters when the output power of the current generators falls again. The only difference in this case is that the output state of the system is determined by inverters with, in each case, two already-connected current generators. The two aforementioned variants of the further development in this case lead to different results.

If variant one is present, the number n is determined by 2, the maximum number of the connected current generators. That means that, of the "first" inverters with, in each case, two connected current generators, two current generators (n=2) are separated, and a "second" inverter with two connected current generators are connected.

The switching operation then takes place when the input power at all inverters has fallen to 50% of the optimum input power. Since, according to the feature of variant one, the condition then applies that:

The input power at a second inverter has dropped to 50% of the optimum input power The total of the output powers at a level of 50% of the two current generators which are connected a first inverter corresponds to the power drop at the second inverter; the output power of the individual current generators has then fallen to 25%.

After the satisfaction of this condition, according to the invention both current generators are switched over from a first to a second inverter. By repetition of this operation for all active inverters, the number of active inverters is reduced to a quarter of the initial situation; the number of the current generators connected to each active inverter is increased fourfold.

If the successive switchover operations at an active inverter are considered and the optimum input power is designated $P_0$, and the actual input power is designated P, then P can assume the following values in each case:

for connection of 1 current generator: $P_0/2\Pi PPP_0$ for connection of 2 current generators: $P_0/2\Pi PPP_0$ for connection of 3 current generators: $P_0/2\Pi PPP_0$ \hfill (1)

wherein each individual current generator makes a contribution p to the actual input power P:

for connection of 1 current generator: $P_0/2\Pi pPP_0$ for connection of 2 current generators: $P_0/4\Pi pPP_0/2$ for connection of 4 current generators: $P_0/8\Pi pPP_0/4$ From equations (1), it can be concluded that the input power to an inverter, irrespective of how many switchover operations have taken place and correspondingly how many current generators are connected to it, always decreases to 50% before the input power is increased back to the optimum power by a new switchover operation. Although this decrease leads relatively far away from the optimum input power, nevertheless, the inverters should be operated in this power range with an acceptable efficiency. The high efficiency of the entire system that can be achieved over relatively long time periods therefore remains unaffected. The advantage of the present variant can also be seen in a very simple construction of the control device.

If variant two is present there occurs, with two current generators on one inverter, a different sequence. The condition for carrying out the switching operation is present when the input power at all inverters has fallen to 66.6% of the optimum input power. Since according to the condition formulated in variant two, the following then applies.

The input power at a second inverter has fallen to 66.6% of the optimum input power, The output power at a level of 33.3% of one of the two current generators connected to a first inverter corresponds to the power drop at the second inverter After the occurrence of this condition, according to the invention one of the two current generators is switched over from a first to a second inverter, which can then be operated with optimum power. The current generator that is not released from the first inverter is then available for switchover to another inverter.

If the successive switchover operations are considered, then with the same designations as above, for the actual input power P, the following values result:

for connection of 1 current generator: $P_0/2\Pi PPP_0$ for connection of 2 current generators: $\frac{2}{3}\Delta P_0 \Pi PPP_0$ for connection of 3 current generators: $\frac{3}{4}\Delta P_0 \Pi PPP_0$ \hfill (2)

where each of the individual current generators makes a contribution p to the actual output power P:

for connection of 1 current generator: $P_0/2\Pi pPP_0$ for connection of 2 current generators: $P_0/3\Pi pPP_0/2$ for connection of 3 current generators: $P_0/4\Pi pPP_0/3$ for connection of 4 current generators: $P_0/5\Pi pPP_0/4$ As can be derived from equations (2), it follows as an advantage of the second variant over the first that the input power at an inverter decreases to an increasingly lesser extent from the output power with each further switchover operation. The inverters and thereby the entire system therefore operate closer to the optimum efficiency in the time between two switchover operations. Compared to variant one, this entails a further improvement of the overall efficiency of the system.

With falling output power of the current generators, the number of the inverters used in the overall system is continually reduced. The described scheme can therefore take place until all current generators are connected to one inverter.

If the output powers of the direct current generators increase again after a decrease, according to an embodiment of the invention, the control device reverses the switchover operations carried out with decreasing output powers in the opposite sequence.

It is advantageous for the conversion of the direct current with inverters if the input sides of the active inverters are electrically disconnected from one another. In an embodiment of the control device of the system according to the invention switches, are therefore provided which implement this requirement.

BRIEF DESCRIPTION OF THE DRAWING FIGURE

Further advantages, details and features of the invention can be taken from the following descriptive portion of the disclosure, in which an exemplary embodiment of the system, according to the invention, with photovoltaic elements as current generators is explained in greater detail with reference to the accompanying drawing, in which FIG. 1 schematically shows a block diagram of the system.

DETAILED DESCRIPTION OF THE DRAWING FIGURE AND PREFERRED EMBODIMENTS

In the system shown in FIG. 1 each inverter is connected at the input side to a current generator. The inverter and the current generator are in each case identical to one another. All current generators have an output power, which corresponds to the optimum input power of the inverter.

In the center field of the figure, the switching elements of the system are shown, which comprise the relays 1 to 15. The current generators 21 to 28 comprise photovoltaic modules of series-connected photovoltaic elements. The inverters are designated with the reference characters 31 to 38. The measurement and control devices are integrated with one another and represented by a single element with the reference numeral 40; numbers 41 to 48 designate electrical lines and 51 to 57 designate control lines. Reference number 58 shows the connection of each inverter to the AC network.

If the measurement device in the case of photovoltaic modules 21 to 28 determines an output power which corresponds to less than or equal to half the optimum input power of the inverter, by opening the relays 9, 11, 13 and 15 and closing the relays 1, 3, 5 and 7, the photovoltaic modules 22, 24, 26 and 28 are separated from the inverters 32, 34, 36 and 38 and connected to the inverters 31, 33, 35 and 37. By this means the input power to the inverters 31, 33, 35 and 37 are in each case doubled and thereby increased back to the optimum input power. These inverters can consequently operate in the optimum efficiency range again and the overall efficiency again reaches its maximum. The inverters 32, 34, 36 and 38 are subsequently disconnected.

On a further reduction of the output power of the photovoltaic modules, of the active inverters 31, 33, 35 and 37, inverters 33 and 37 are disconnected to ensure that the remaining inverters 31 and 35 operate in the optimum efficiency range.

The relay switching of the exemplary embodiment shown here further ensures that, at the direct current side, the active inverters are electrically disconnected from one another.

The represented steps effect an optimisation in the sense that the respective active inverters in each case operate at or close to the optimum operating point. From this, for the entire system for feeding electrical energy from direct current generators into the alternating current network, an operation in the optimum efficiency range results. Photovoltaic systems designed according to the present invention can therefore be operated with optimum efficiency throughout the entire year.

What is claimed is:

1. A system for feeding direct current into an alternating current network, comprising:

a plurality of active inverters with etch of said active inverters having an optimum input power and being connected at a respective input side to at least one direct current generator of fluctuating output power; and, means for switching said at least one direct current generator from a first active inverter to a second active inverter, or vice-versa, of said plurality of active inverters for effecting a switchover operation; and, a control device for initiating said switchover operation upon fulfillment of a condition, said control device including means for determining when said condition is fulfilled.

2. The system for feeding direct current into an alternating current network according to claim 1, wherein said moans for determining when said condition is fulfilled include, a measurement device for ascertaining that an actual input power applied to said second active inverter has fallen to a value that is less than said optimum input power by an amount corresponding to a total of said fluctuating output powers of a said at least one direct current generators, n being an integer and having a minimum value of 1 and a maximum value equal to that of a number of all of said at least one direct current generators connected to said first active inverter of said plurality of active inverters, with a being specified by said control device.

3. The system for feeding direct current into an alternating current network according to claim 2, wherein said switchover operation effects a separation of a direct current generators from said first active inverter to a connection of these n direct current generators to said second active inverter.

4. The system for feeding direct current into an alternating current network according to claim 2, wherein n is equal to all of said direct current generators connected to said first active inverter.

5. The system for feeding direct current into an alternating current network according to claim 1, wherein said means for switching carries out said switchover operation for all of said plurality of active inverters and all of said at least one direct current generator which have an input power and said fluctuating output power fulfilling said condition as determined by said control device.

6. The system for feeding direct current into an alternating current network according to claim 1, wherein with increasing said fluctuating output power of said at least one direct current generator, said control device initiates said means for switching for reversing said switch-over operation carried out with decreasing said fluctuating output power of said at least cue direct current generator in an opposite sequence to a prior said switchover operation.

7. The system for feeding direct current into an alternating current network according to claim 1, wherein said control device includes switches for electrically disconnecting said respective input side of each of said plurality of active inverters from one of said at least one direct current generator.

8. The system for feeding direct current into an alternating current network according to claim 1, further comprising at least one photovoltaic element far providing current generated by said at least one direct current generator.

* * * * *